Sept. 4, 1945. N. A. HARRISON 2,384,302
CHUCK
Filed July 5, 1944
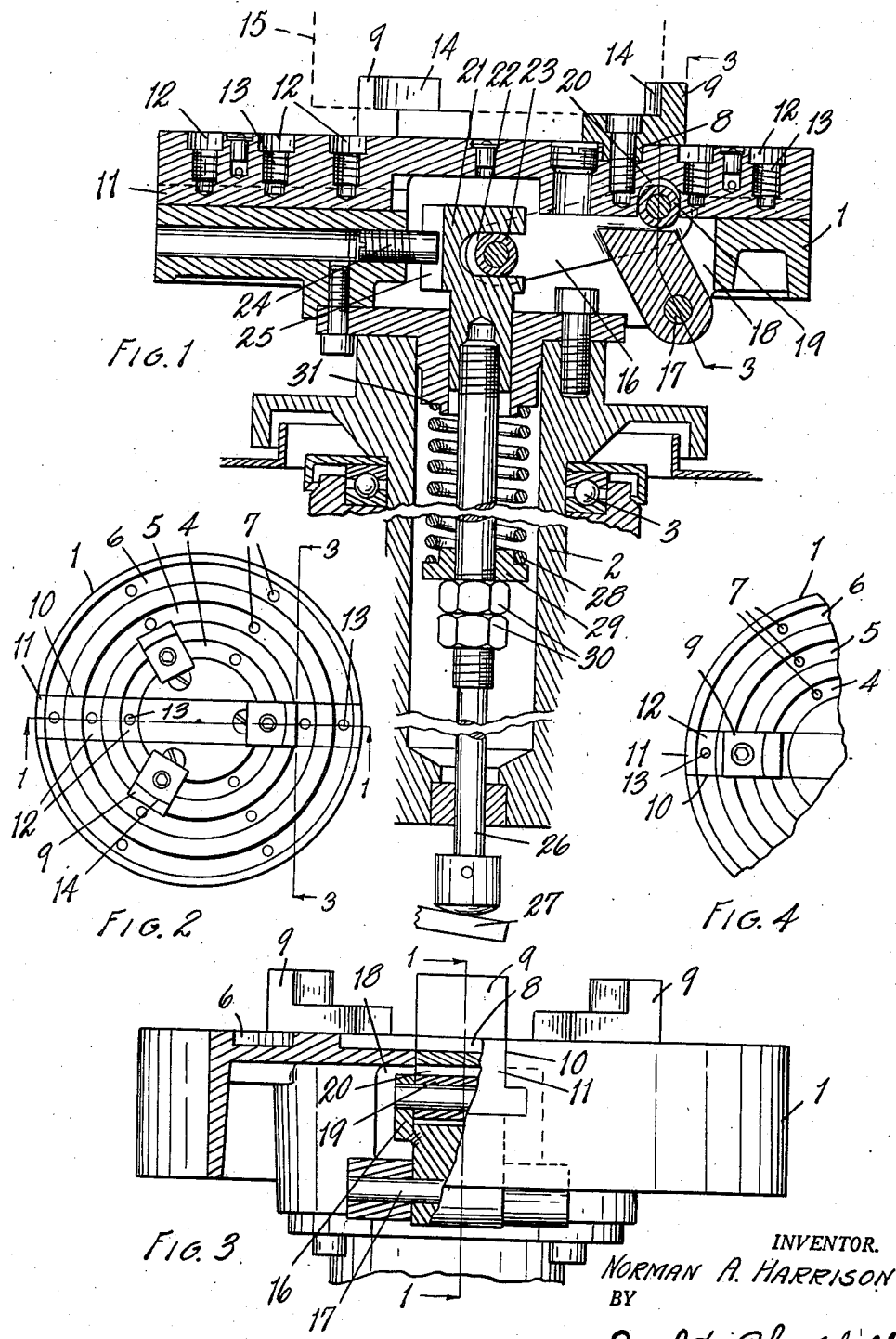
INVENTOR.
NORMAN A. HARRISON
BY
Earl & Chappell
ATTORNEYS.

Patented Sept. 4, 1945

2,384,302

UNITED STATES PATENT OFFICE 2,384,302

CHUCK

Norman A. Harrison, Kalamazoo, Mich., assignor to Hammond Machinery Builders, Inc., Kalamazoo, Mich., a corporation of Michigan Application July 5, 1944, Serial No. 543,509

8 Claims. (Cl. 279—119)

This invention relates to improvements in chucks.

The main objects of this invention are:

First, to provide a chuck which is adapted for a considerable range of work and may be readily adapted either for internally or externally engaging the work.

Second, to provide a chuck which may be readily adjusted by a comparatively unskilled workman to effectively support work of various diameters.

Third, to provide a structure having these advantages which is comparatively simple in structure and very strong and durable and capable of rapid manipulation.

Objects relating to details and economies of the invention will appear from the description to follow. The invention is defined and pointed out in the claims.

A preferred embodiment of the invention is illustrated in the accompanying drawing, in which:

Fig. 1 is an enlarged fragmentary view mainly in section on line 1—1 of Figs. 2 and 3 of a chuck embodying the features of my invention, a piece of work being indicated by dotted lines.

Fig. 2 is a plan view of my improved chuck.

Fig. 3 is an enlarged fragmentary view partially in section on line 3—3 of Figs. 1 and 2.

Fig. 4 is a fragmentary plan view illustrating my improved chuck adapted as an internal chuck.

I have, in the embodiment of my invention illustrated, shown only such parts as seen desirable for an understanding of a commercial embodiment of my invention.

My improved chuck in the embodiment illustrated comprises a head or body member 1 provided with a spindle 2 mounted in suitable bearings shown conventionally at 3. The face of the head or body member 1 is provided with a plurality of concentric recesses 4, 5 and 6 having tapped bores 7 in the bottoms thereof. These recesses are adapted to receive shanks or lugs 8 on the underside of the jaws 9.

The body member is provided with a slideway 10 which extends entirely across the body member and through the center thereof so that it intersects the groove-like recesses. Within this slideway I mount a jaw slide 11 having segmental recesses 12 therein which align or complement the recesses in the body member when the jaw slide is in its central position as illustrated in Fig. 2. The jaw slide recesses have tapped bores 13 in the bottoms thereof adapted to receive the jaws 9.

It will be noted that the bores 7 and the bores 13 are arranged in radially aligned series and that the bores in the head member are axially spaced 60° from the bores in the jaw slides—that is, considering the bores in the slide on opposite sides of the center thereof, which results in a structure which permits the arrangement of a set of three jaws, as shown in Fig. 2, with the jaws on the body member in 120° angular relation to the jaw on the slide.

It will be appreciated that three sets of external jaws must be provided for the embodiment illustrated in order that their lugs may fit the recesses and also that the jaw faces 14 may properly fit the work—that is, if they are curved to fit cylindrical work as indicated by dotted lines at 15 the jaw faces might be otherwise shaped to fit other shapes of work.

Where it is desired to internally engage the work, the jaw mounted on the slide is arranged on the opposite end of the slide from that shown in Fig. 2 and the jaws on the head member are engaged in the seats at 120° angular relation to the jaw on the slide and 120° angular relation to each other. Thus arranged, the slide may be actuated to engage the work either internally or externally by the same sliding movement of the jaw.

In the embodiment illustrated, the jaw slide is actuated by means of the angled actuating lever 16 which is pivoted at 17 in a recess or chamber 18 provided in the body member, the lever being provided with a roller 19 at its angle engaging a slot 20 in the under side of the slide so that as the lever is actuated on its pivot the slide is actuated in one direction. The lever is actuated by means of the plunger 21 which is mounted for slidable movement within the spindle and is notched at 22 to engage the roller 23 on the end of the lever.

A pin 24 engaging the slot 25 in the plunger prevents rotating movement of the plunger. The plunger is provided with an extension rod 26 extending from the bottom of the spindle to be engaged by the manually actuating element 27. A coiled spring 28 is supported at one end by the thrust member 29 on the plunger which is adjustably supported by the nuts 30. The other end of the spring engages a thrust shoulder 31.

With this arrangement of parts, the spring acts to close the jaw—that is, to move the slidable or adjustable jaw to closed position, being released or retracted for receiving and releasing the work through the control member 27.

The embodiment of my invention illustrated is adapted for a wide range of work and for both internal and external work engagement. I have illustrated only one set of jaws but it will be understood that at least three sets of jaws should be provided for the embodiment illustrated, but it should also be understood that a very wide range of work may be suitably chucked by suitably shaping the jaw engaging faces. This I have not attempted to illustrate as it is believed that this adaptation of my invention will be readily understood by those skilled in the art to which my invention relates.

Having thus described my invention, what I claim as new and desire to secure by Letters Patent is:

1. In a chuck, the combination of a body member provided with a spindle and having a plurality of concentric groove-like recesses in the face thereof and a jaw slideway extending radially across the same and intersecting the said recesses, a jaw slide disposed in said slideway and having segmental recesses therein aligned with and complementing said recesses in said body member when the jaw slide is in its initial position, a set of jaws removably engageable with said recesses in said body member and slide member, one of the jaws of the set being disposed in a recess of said jaw slide corresponding to the recesses of said body member in which the other jaws of the set are disposed, an angled jaw slide actuating lever pivotally mounted at one end within said body member and operatively engaged at the angle thereof with said jaw slide, said jaw slide extending on opposite sides of the axial center of said body member whereby when the jaw carried thereby is positioned on one side of the axial center of the body member it acts as an external jaw and on the other side as an internal jaw, an actuating member disposed axially of the chuck spindle for reciprocating movement and operatively engaged with the swinging end of said actuating lever, and a spring arranged within said spindle in cooperating relation to said actuating member for actuating said actuating lever to jaw closing position.

2. In a chuck, the combination of a body member having a plurality of concentric groove-like recesses in the face thereof and a jaw slideway extending radially across the same and intersecting the said recesses, a jaw slide disposed in said slideway and having segmental recesses therein aligned with and complementing said recesses in said body member when the jaw slide is in its initial position, said recesses in said body member and jaw slide having radially aligned angularly spaced tapped bores in the bottoms thereof, a set of jaws having lugs removably engageable with said recesses in said body member and slide member, said jaws having countersunk bores therein receiving attaching screws coacting with said tapped bores in the bottoms of said recesses, one of the jaws of the set being disposed in a recess of said jaw slide corresponding to the recesses of said body member in which the other jaws of the set are disposed, and means for actuating said jaw slide.

3. In a chuck, the combination of a body member having a plurality of concentric groove-like recesses in the face thereof and a jaw slideway extending radially across the same and intersecting the said recesses, a jaw slide disposed in said slideway and having segmental recesses therein aligned with and complementing said recesses in said body member when the jaw slide is in its initial position, said recesses in said body member and jaw slide having radially aligned angularly spaced tapped bores in the bottoms thereof, a plurality of jaws having lugs removably engageable with said recesses in said body member and slide member, said jaws being adapted to receive attaching screws coacting with said tapped bores in the bottoms of said recesses, one of the jaws of the set being disposed in a recess of said jaw slide corresponding to the recesses of said body member in which the other jaws of the set are disposed, a jaw slide actuating lever operatively connected to said jaw slide, said jaw slide extending on opposite sides of the axial center of said body member whereby when the jaw carried thereby is positioned on one side of the axial center of the body member it acts as an external jaw and on the other side as an internal jaw, an actuating member for said lever, and a spring arranged in cooperating relation to said actuating member for actuating it to jaw closing position.

4. In a chuck, the combination of a body member having a plurality of concentric groove-like recesses in the face thereof and a jaw slideway extending radially across the same and intersecting the said recesses, a jaw slide disposed in said slideway and having segmental recesses therein aligned with an complementing said recesses in said body member when the jaw slide is in its initial position, a plurality of jaws having lugs removably engageable with said recesses in said body member and slide member, means for removably securing said jaws in said recesses, one of the jaws of the set being disposed in a recess of said jaw slide corresponding to the recesses of said body member in which the other jaws of the set are disposed, and means for actuating said jaw slide.

5. In a chuck, the combination of a rotatable body member having a plurality of radially disposed jaw seats with which jaws of selected sets may be engaged in angularly disposed relation, a jaw slide slidably mounted on said body member and having a plurality of jaw seats on opposite sides of the axial center of the body member and with which a jaw of a set may be engaged in angular relation to the jaws of said body member, and means for actuating said jaw slide relative to the body member, the jaw seats being adapted to receive jaws in 120° angular relation to a jaw on said slide when arranged on either side of the axial center of the body member.

6. In a chuck, the combination of a rotatable body member having a plurality of radially disposed jaw seats with which jaws of selected sets may be engaged in angularly disposed relation, a jaw slide slidably mounted on said body member and having a plurality of jaw seats on opposite sides of the axial center of the body member and with which a jaw of a set may be engaged in angular relation to the jaws of said body member, and means for actuating said jaw slide relative to the body member.

7. In a chuck, the combination of a rotatable body member having a plurality of radially disposed jaw seats with which jaws may be engaged in angularly disposed relation, and a jaw slide slidably mounted on said body member and having a plurality of jaw seats on opposite sides of the axial center of the body member and with which a jaw may be engaged in angular relation to the jaws of said body member, the jaw seats of the body member being adapted to receive jaws in angular relation to a jaw on said slide when the last named jaw is arranged on either side of the axial center of the body member.

8. In a chuck, the combination of a rotary body member, a set of jaws secured to the face of said body member, a jaw slide slidably mounted on said body member, said jaw slide having a jaw thereon positioned relative to said set of jaws to releasably engage the work, and means for actuating said jaw slide, said means including a spring for actuating the jaw slide with jaw thereon to a work engaging position, said means including means for actuating the jaw slide against the tension of said spring to release the work, said last named means including a lever pivotally connected to said body member and operatively connected to said jaw slide to slide the same on the body member and having a swinging end, and a member disposed to reciprocate parallel to the axis of said body member and operatively connected to said swinging end of the lever to actuate the same.

NORMAN A. HARRISON.